United States Patent [19]

Dil

[11] 4,423,502
[45] Dec. 27, 1983

[54] RECORD CARRIER HAVING AN OPTICALLY READABLE INFORMATION STRUCTURE

[75] Inventor: Jan G. Dil, Eindhoven, Netherlands

[73] Assignee: U.S. Philips Corporation, New York, N.Y.

[21] Appl. No.: 301,155

[22] Filed: Sep. 11, 1981

[30] Foreign Application Priority Data

Jan. 12, 1981 [NL] Netherlands .......... 8100098

[51] Int. Cl.³ ............................................. G11B 7/24
[52] U.S. Cl. ................... 369/275; 369/109; 369/93
[58] Field of Search ............... 369/93, 94, 95, 109, 369/111, 275; 346/76 L, 135.1

[56] References Cited

U.S. PATENT DOCUMENTS

| | | | |
|---|---|---|---|
| 4,041,530 | 8/1977 | Kramer et al. | 369/109 X |
| 4,161,752 | 7/1979 | Basilico | 369/93 |
| 4,209,804 | 6/1980 | Dil | 369/275 |
| 4,230,915 | 10/1980 | Dil et al. | 369/275 |
| 4,310,916 | 1/1982 | Dil | 369/275 |
| 4,325,135 | 4/1982 | Dil et al. | 369/94 X |
| 4,326,282 | 4/1982 | Verboom et al. | 369/275 X |

FOREIGN PATENT DOCUMENTS 2036410 6/1980 United Kingdom .......... 369/275

*Primary Examiner*—Stuart N. Hecker
*Assistant Examiner*—Donald McElheny, Jr.
*Attorney, Agent, or Firm*—Thomas A. Briody; Robert T. Mayer; Algy Tamoshunas

[57] ABSTRACT

A record carrier is disclosed in which information is recorded in an optically readable information structure of track-wise arranged information areas which alternate with intermediate areas. Adjacent information track portions are situated at different, parallel planes spaced from each other by a predetermined distance such as to reduce crosstalk from neighboring tracks thereby permitting the information density to be substantially increased.

12 Claims, 8 Drawing Figures

RECORD CARRIER HAVING AN OPTICALLY READABLE INFORMATION STRUCTURE

BACKGROUND OF THE INVENTION

The invention relates to a record carrier provided with information in an optically readable information structure of track-wise arranged information areas which alternate with intermediate areas.

In the case of a circular disc-shaped record carrier the information tracks may be concentric tracks or alternatively, quasi-concentric tracks which are linked to each other, together constituting a spiral track.

Such a record carrier is described in the Applicant's Netherlands patent application No. 78 03517, which corresponds to U.S. application Ser. No. 419,640 filed Sept. 17, 1982. The known record carrier may contain a television programme, the information being encoded in the frequency and/or the dimensions of the information areas in the track direction. The information areas may comprise pits pressed into the carrier surface or hills projecting from this surface or both. Alternatively, the information may be encoded in digital form, in which case the information areas and intermediate areas may also have a constant dimension in the track direction. A specific combination of information areas and intermediate areas then represents a specific combination of digital zeros and ones.

For optical record carriers a maximum information density is desirable, which in the case of a carrier containing a television programme means: a maximum playing time. For this purpose the information tracks would have to be arranged as closely as possible to each other. However, the distance between the information tracks cannot be selected arbitrarily small. For known record carriers, in which the information areas of adjacent information tracks have the same geometry, except for the dimension in the track direction, all the information areas influence the read-beam radiation in a similar manner. The read spot formed on the information structure by the read beam has a specific, for example Gaussian, intensity distribution. The half-value diameter of said spot, i.e. the distance between two points in the spot where the intensity is equal to $1/e^2$ of the intensity in the centre of the spot, is of the order of magnitude of or greater than the width of the information areas, hereinafter referred to as track width. This means that even in the case of a correct tracking of the read spot, an amount of radiation will fall outside the track and may be incident on adjacent tracks. The amount of radiation incident on the adjacent tracks increases as the track distance decreases. The track distance is the distance between the edges of two radially adjacent information areas. This distance is equal to the width of the informationless lands situated between the information tracks. A certain part of the radiation which is incident on the adjacent tracks and which is modulated by the information areas of these information tracks may reach a radiation-sensitive detector, which is adapted to receive the radiation modulated by the track to be read. This effect, the crosstalk effect, determines the minimum distance between the information tracks.

In Netherlands patent application No. 78 03517, which has been laid open to public inspection. It is proposed to increase the information density by giving the information pits of adjacent tracks different depths and reading said information tracks in different ways. The information tracks whose information areas have a first depth are read by determining the variation of the total intensity of the radiation returning from the record carrier and passing through the pupil of the read objectives. This is the so-termed integral read method. The information tracks whose information areas have the second depth are read by determining the intensity difference in two tangentially different halves of the pupil of the read objective. This is the so-called differential read method. When reading a first information track with the one read method an adjacent information track to be read with the other read method is hardly observed, so that the information tracks can be arranged substantially more closely to each other without excessive crosstalk.

For reading such a record carrier a suitably adapted read apparatus should be used, that is to say a read apparatus which can be switched from the one read method to the other. Since the two read methods have different optical transfer functions ("Modulation Transfer Function": "MTF") the alternate use of the two read methods may be perceptible in the signal which is ultimately produced by the read apparatus. Moreover, the information areas with a lower spatial frequency cannot be read in an optimum manner by means of the differential method. Furthermore, the transitions between track portions with deeper information areas and the track portions with shallower information areas should be optically marked, in the record carrier itself, in order to provide an indication to the read apparatus when switching over is to take place. The servo system which ensures that the read spot formed on the information structure accurately follows an information track to be read is sensitive to the depth of the information areas. Therefore, this servo system should also be adapted in the case of a transition from deeper to shallower information areas and vice versa.

SUMMARY OF THE INVENTION

It is the object of the present invention to increase the information density in a record carrier for information such as a television programme, an audio programme or digital information, for example from and for a computer, without requiring an adaptation of the read apparatus. According to the invention the record carrier is characterized in that adjacent information track portions differ from each other in that they are located at different levels, whilst within each track portion the information areas themselves are all situated at the same level.

Owing to the different levels of the adjacent information track portions it is achieved that the side portions of a read spot scanning a specific information track, which side portion passes over an adjacent information track, is hardly modulated by the information contained in said adjacent information track. Care has been taken to ensure that for a specific read method, the differential or the integral method, the detector cannot discriminate between the information areas of the adjacent information track and the intermediate areas of this track.

It is to be noted that, inter alia U.S. Pat. No. 3,855,426, discloses record carriers in which the information is arranged at different levels. However, such record carriers contain a plurality of information layers, all information tracks in each information layer being situated at the same level.

For a circular disc-shaped record carrier the adjacent information tracks may be situated at different levels.

Suitably, all information tracks at a first or second level then together constitute a first and a second spiral information track respectively, the read direction for the first spiral information track being from the centre of the record carrier towards its circumference and the read direction for the second spiral information track being from the circumference of the record carrier towards its centre.

Alternatively, successive information track portions within one turn of a track revolution may be situated at different levels. If a television programme is stored in the record carrier each of the information track portions may contain the information corresponding to one television line.

The invention may be employed both in record carriers to be read in reflection and record carriers to be read in transmission. Furthermore, the invention may be used both for record carriers adapted to be read by the integral method and record carriers adapted to be read by the differential method. The information structure in the information tracks may either be a phase or an amplitude structure.

A preferred embodiment of a record carrier in accordance with the invention, in which the information structure is a reflecting phase structure, is characterized in that the effective difference in level between adjacent information track portions is approximately half the effective depth, or the effective height, of the information areas within their tracks.

For an information structure comprising information areas in the form of pits in the information tracks the concept of effective depth may be used. This effective depth is the difference in level between the information areas and the intermediate areas as observed by the read beam. The information structure may be regarded as a diffraction grating which splits the read beam into a zero-order subbeam, a plurality of first-order subbeams and a plurality of higher-order subbeams, the zero-order subbeam and, inter alia, the first-order subbeams having a relative phase difference. The specific phase difference which occurs if the centre of the read spot coincides with the centre of an information area is called the phase depth. For an optimum read-out of an information structure in accordance with the integral method or the differential method, said phase depth should have a first and a second value respectively. A specific, measured, phase depth corresponds to a specific value of said effective depth of the information areas.

If an information area has perpendicular walls and the width of the information area is greater than the effective wavelength of the read beam, the effective depth of said area is mainly determined by the geometric depth of the information area. If the information areas have a certain wall steepness and the width of the information areas is of the order of magnitude of or smaller than the effective wavelength of the read beam, the effective depth also depends on the said width and wall steepness, and polarization of read beam.

If the information areas have the form of hills which project from the information track the term effective height instead of effective depth should be used.

In analogy with the foregoing the concept of: "effective difference in level between the information tracks" may be used. This is the difference in level as observed by the read beam. This difference in level is determined by the geometrical difference in level, the steepness of the walls of the information tracks and the width of the information tracks relative to the effective wavelength of the read beam.

The effective depth of the information areas and the effective difference in level or effective distance between the information tracks, in the case of a reflecting information structure, may be expressed in the effective wavelength of the read beam. The last-mentioned wavelength is the wavelength at the location of the information structure. If the information structure is covered with a transparent protective layer having a refractive index n, the effective wavelength is equal to the wavelength in vacuo ($\lambda o$) divided by n. For a record carrier having a reflecting phase structure which is read by the integral method or the differential method the optimum effective depth of the information areas is equal to $\lambda e/4$ and $\lambda e/8$, respectively. In accordance with the invention the effective difference in level, i.e. the effective distance, between adjacent information track portions in such record carriers is $\lambda e/8$ and $\lambda e/16$ respectively. An effective depth of $\lambda e/4$ and $\lambda e/8$ means that the zero-order subbeam and one of the first-order subbeams exhibit a phase difference of $\pi$ rad. and $\pi/2$ rad. respectively.

If the information structure is an amplitude structure the information areas and the intermediate areas are in principle situated at the same level in their tracks. Such a structure introduces a phase difference of $\pi$ rad. between the zero-order subbeam and one of the first-order subbeams and with respect to its phase behaviour it may be compared with a reflecting phase structure whose information areas having an effective depth of $\lambda e/4$.

A record carrier in accordance with the invention having an amplitude structure, is characterized in that the effective difference in level, i.e. the effective distance between adjacent information track portion has a value between approximately $\lambda e/8$ and approximately $\lambda e/4$, $\lambda e$ being the wavelength of the read beam at the location of the information structure.

BRIEF DESCRIPTION OF THE DRAWING

The invention will now be described in more detail with reference to the drawing wherein.

DETAILED DESCRIPTION OF THE INVENTION

Figure 1:
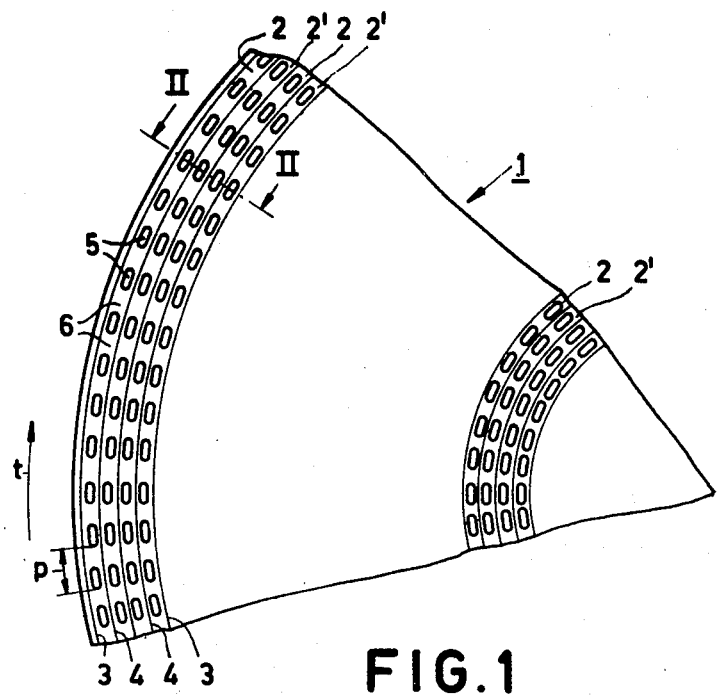
FIG. 1 shows a part of a record carrier in plan view.

As is shown in FIG. 1, the information structure of the record carrier 1 comprises a plurality of information areas 5 arranged in information tracks 2 and 2'. In the track direction, or tangential direction t, the information areas are spaced from each other by intermediate areas 6. The information structure may be a reflecting or radiation-transmitting phase structure. The information areas are then for example constituted by pits pressed into the record carrier surface or by hills projecting from said surface. Alternatively, the information structure may be an amplitude structure. The information areas are then for example non-reflecting areas in a surface the rest of which is reflecting.

The information to be disseminated by means of the record carrier is contained in the variation of the areas in the tangential direction t only. If a colour television programme is stored in the record carrier, the luminance signal may be encoded in the variation of the spatial frequency of the information areas 5 and the chrominance and audio signal in the variation of the lengths of said areas. The record carrier may alternatively contain digital information. Then a specific combination of information areas 5 and intermediate areas 6 represent a specific combination of digital ones and zeros.

Figure 3:
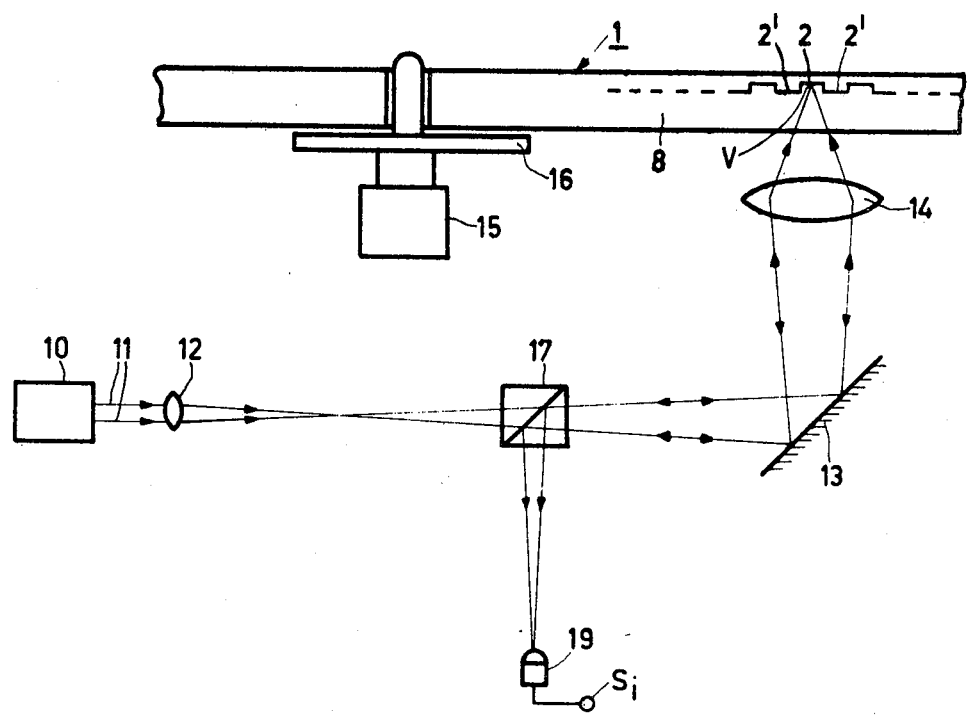
FIG. 3 is a read apparatus which is known per se.

The record carrier can be read by means of an apparatus which is schematically represented in FIG. 3. A beam 11 which is emitted by a gas laser 10, for example, a Helium-Neon laser, is reflected to an objective system 14 by a mirror 13. In the path of the radiation beam 11 an auxiliary lens 12 is arranged, which ensures that the pupil of the objective system 14 is filled. On the information structure a read spot V is formed. The information structure is schematically represented by the information tracks 2 (2'); this means that the record carrier is shown in radial cross-section.

The information structure may be situated on the side of the record carrier which faces the laser. However, suitably, as is shown in FIG. 3, the information structure is located on the side of the record carrier which is remote from the laser, so that the record carrier is read through the transparent substrate 8 of the record carrier. The advantage of this is that the information structure is protected against fingerprints, dust particles and scratches.

The read beam 11 is reflected by the information structure and, as the record carrier is rotated by means of a turntable 16 driven by a motor 15, it is modulated in accordance with the sequence of the information areas 5 and the intermediate areas 6 in an information track being read. The modulated read beam agains passes through the objective system 14 and is reflected by the mirror 13. In order to separate the modulated read beam from the non-modulated read beam a beam splitter 17 is arranged in the radiation path. The beam splitter may be a semi-transparent mirror or alternatively a polarization-sensitive splitter prism. In the last-mentioned case a quarter-wave plate should be arranged between the objective system and the splitter prism. Quarter-wave then means a quarter of the wavelength of the read beam 11. The beam splitter 17 reflects a part of the modulated read beam to a radiation-sensitive detection system 19, which for example comprises a single photodiode arranged on the optical axis of the read system. The output signal Si of the detector 19 is modulated in accordance with the information stored in the information track to be read. The principle of optical read-out is described in inter alia "Philips Technical Review" 33, no. 7, pages 186–189 and will not be discussed in more detail.

Figure 2:
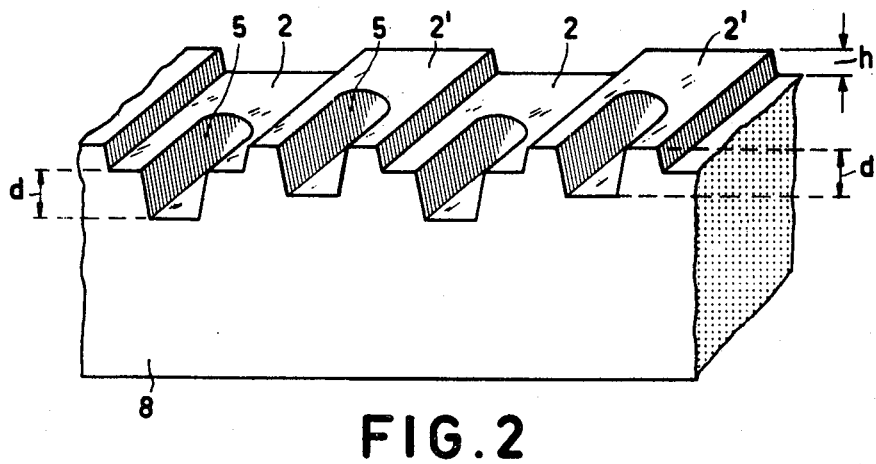
FIG. 2 is a perspective view of a small part of said record carrier.

The half-value diameter of the read spot V is of the order of magnitude of or greater than the track width, so that a part of the read radiation falls outside the information track. When the track distance is small a part of the read beam using for reading a first information track is incident on an adjacent track. In order to prevent this part of the radiation from being modulated in accordance with the sequence of information areas and intermediate areas in this adjacent information track, the adjacent tracks are arranged at different levels in accordance with the invention, as is shown in FIG. 2.

In this Figure, which shows a small part of the record carrier in a sectional view taken on the line II—II' of FIG. 1, the information tracks are designated 2 and 2'. The difference in level or distance between an information track 2 and an information track 2' is h. The information areas 5 all have the same depth d. For the sake of clarity d and h are shown exaggerated in comparison with the thickness of the substrate 8.

Now the physical background of the invention will be explained. The information structure may be regarded as a diffraction grating which splits the read beam into a non-diffracted zero-order subbeam, a plurality of first-order subbeams and a plurality of higher-order subbeams. For read-out the subbeams which are diffracted in the track direction are of major importance and of these beams mainly the first-order subbeams. The numerical aperture of the objective system and the wavelength of the read beam are adapted to the information structure in such a way that the higher-order subbeams mainly fall outside the pupil of the objective system and do not reach the detector. Moreover, the amplitudes of the higher-order subbeams are small relative to the amplitudes of the zero-order subbeam and the first-order subbeams.

Figure 4:
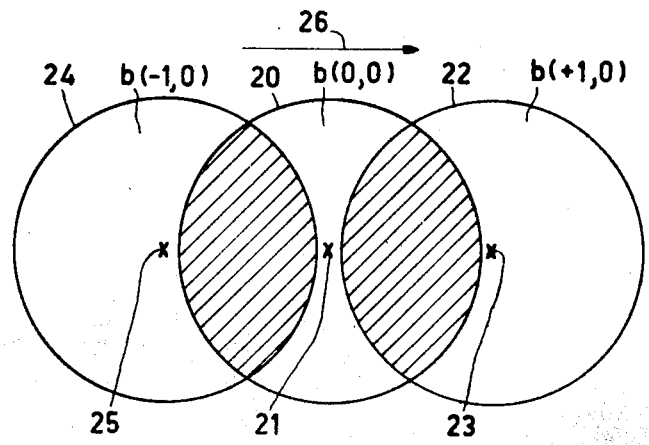
FIG. 4 represents different diffraction orders of the read beam.

FIG. 4 represents the cross-sections of the first-order subbeams, which are diffracted in the track direction, in the plane of the exit pupil of the objective system. The circle 20 with a centre 21 represents the exit pupil. This circle also represents the cross-section of the zero-order subbeam b (0,0). The circles 22 and 24 with the respective centres 23 and 25 represent the cross-sections of the first-order subbeams b(+1,0) and b(−1,0) respectively. The arrow 26 indicates the track direction. The distance between the centre 21 of the zero-order subbeam and the centres 23 and 25 of the first-order subbeams is determined by $\lambda/p$, where p (see FIG. 1) represents the period of the areas 2 at the location of the read spot V.

For the present method of describing the read process it may be said that the first-order subbeams overlap the zero-order subbeam and interference occurs in the hatched areas in FIG. 4. The phases of the first-order subbeams vary if the read spot moves relative to the information track. As a result of this, the intensity of the total amount of radiation which passes through the exit pupil of the objective system and which reaches the detector 19 will vary.

If the centre of the read spot coincides with the centre of an information area 5, there will be a specific phase difference $\psi$, called phase depth, between a first-order subbeam and the zero-order subbeam. If the read spot moves to a following information area, the phase of the subbeam b(+1,0) increases by $2\pi$. Therefore, if the read spot moves in the tangential direction, the phase of this subbeam relative to the zero-order subbeam varies by $\omega t$. Here $\omega$ is a time frequency which is determined by the spatial frequency of the information areas 5 and by the velocity with which the read spot moves over a track. The phase $\phi(+1,0)$ and $\phi(-1,0)$ of the subbeam b(+1,0) and the subbeam b(−1,0) respectively, relative to the zero-order subbeam b(0,0) may respectively be represented by:

$$\phi(+1,0) = \psi + \omega t \text{ and}$$

$$\phi(-1,0) = \psi - \omega t.$$

In the case of the integral read method shown in FIG. 3, the portions of the first-order subbeams passing through the objective system are combined with the zero-order subbeam on one detector 19. The time-dependent output signal of this detector may then be represented by:

$$S_i = A(\psi) \cdot \cos\psi \cdot \cos(\omega t)$$

where $A(\psi)$ decreases at increasing value of $\psi$. The amplitude $A(\psi) \cdot \cos\psi$ of the signal $S_i$ is now maximum for a phase depth of $\psi = \pi$ rad.

In the case of differential read-out a detector is arranged in each of the areas of overlap, which are shown hatched in FIG. 4. The output signals of these detectors are substracted from each other, so that a signal $S'_i$ is obtained which is given by:

$$S'_i = B(\psi) \cdot \sin\psi \cdot \sin(\omega t)$$

where $B(\psi)$ decreases at decreasing value of $\psi$. The amplitude $B(\psi) \cdot \sin\psi$ of the signal $S'$ is maximum for the phase depth $\psi = \pi/2$ rad.

Figure 5:
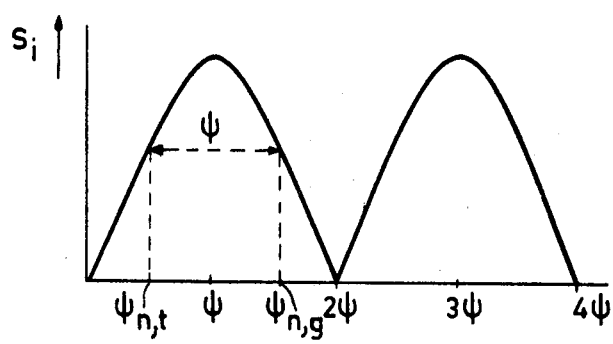
FIG. 5 is a vectorial representation of the information signal and the cross-talk signal.

In general, the signal $S_i$ as a function of the phase depth $\psi$ will vary as shown in FIG. 5. The maxima of this signal are situated at $\psi$, $3\psi$ etc. and the minima at $0, 2\psi$ etc., where $\psi = \pi$ rad for the integral method and $\psi = \pi/2$ rad for the differential method.

Figure 6:
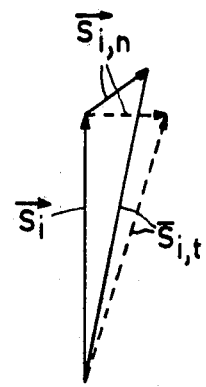
FIG. 6 represents the variation of the information signal as a function of the phase depth.

Assume that at a specific instant an information track 2' is being read. This information track is surrounded by adjacent tracks 2. Since the read spot is not point-shaped, but is a larger spot having a specific intensity distribution, these tracks 2 will receive a part of the read radiation and reflect a certain amount of radiation to the objective system and the detector 19. According to the invention, the adjacent track is situated at a different level than the track being read. The detector then "observes" two different gratings. The resulting signal from the detector then comprises two siganls: the main signal $S_i$ and the cross-talk signal $S_i, n$. These signals as well as the complete signal $S_i,t$ are represented as vectors $\overline{S_i}$, $\overline{S_1}$, $\overline{n}$ and $\overline{S_t}$ in FIG. 6. The direction of $\overline{S_i}$ is determined by the phase depth $\psi$. As the read spot V moves over an information track 2' the length of the vector $\overline{S_i}$ and thus that of the vector $\overline{S_i,t}$ will vary. If the modulation of the signal $S_i,t$ as a result of the sequence of information areas and intermediate areas in an information track 2 should be minimized, the vector $\overline{S_{i,n}}$ should be perpendicular to the vector $\overline{S_i}$ as indicated by the broken line $\overline{S_{i,n}}$ in FIG. 6. The magnitude of $\overline{S_{i,t}}$ then equals the magnitude of $\overline{S_i}$ to an optimum extent. This means that the difference in level between the information tracks 2' and 2 should be half the phase depth $\psi$.

This will also be evident from FIG. 5. The cross talk of an information track 2 to the information track 2' is minimal if the signal $S_i,n$ remains equal for a transition from an information area in an information track 2 to an intermediate area in this track and vice versa. On the other hand, the phase depth of the information area in an information track 2 is equal to the phase depth $\psi$ of the information areas in the information track 2'. It follows that the information track 2 itself should be situated at a depth (or height) corresponding to half the phase depth $\psi$, whilst the information areas of said information track should be situated at a depth (or height) corresponding to $$\frac{3}{2}\psi.$$

The depth (or height) of the information track 2 and of the information areas of this track are represented by $\psi_{n,t}$ and $\psi_{n,g}$ in FIG. 5.

As stated previously, the optimum phase depth is $\psi = \pi$ rad. for a record carrier having a phase structure and being read by means of the integral method. For such a record carrier the effective difference in level between the information tracks 2 and 2' should correspond to $\pi/2$ rad.

If the information structure is a reflecting structure, the phase depth $\psi = \pi$ rad. is obtained if the effective depth of the information areas or the effective height of the hills, if the information areas are hills, is $\lambda_e/4$. The effective difference in level of the information tracks is then half this value, hence $\lambda_e/8$.

If the information structure is a transparent phase structure on a transparent substrate having a refractive index $n_1$ and covered with a transparent protective layer having a refractive index $n_2$, the optimum phase depth $\psi = \pi$ rad is obtained if the effective depth or height of the information areas is $$\frac{\lambda_O}{2(n_1 - n_2)}.$$

Here $\lambda_O$ is the wavelength in vacuo. The effective difference in level h of the information tracks for minimum crosstalk between these tracks is then equal to $$\frac{\lambda_O}{4(n_1 - n_2)}.$$

It is to be noted that the effective depth of the information areas 5 or the effective difference in level between the information tracks 2 and 2' only correspond to the depth d and the difference in level h respectively if the information areas and the information tracks have perpendicular walls and widths greater than the effective wavelength of the read beams. In the case of non-perpendicular walls and widths of the order of the effective wavelength the wall steepness and the direction of polarisation of the read beam also influence the effective depth and the effective difference in level. In general, in the cases considered in the foregoing of a phase structure read in reflection or transmission, the phase depth of the information areas should be $\pi$ rad. and the phase depth difference of the information tracks should be $\pi/2$ rad.

As already stated, for a record carrier read in accordance with the differential method the phase depth should be $\psi = \pi/2$ rad. and the effective difference in level between the information tracks should correspond to $\pi/4$ rad.

If the information structure is a reflecting phase structure the phase depth $\psi = \pi/2$. of the information areas is obtained if said areas have a depth or height of $\lambda_e/8$. The desired effective difference in level between the information tracks is then $\lambda_e/16$.

If a transparent phase structure, provided on a substrate having a refractive index $n_1$ and coated with a protective layer having a refractive index $n_2$ is to be read in optimum manner in accordance with the differential method, the information areas should have an effective depth of $$\frac{\lambda_O}{4(n_1 - n_2)},$$

whilst the effective difference in level between the information tracks should be $$\frac{\lambda_O}{8(n_1 - n_2)}.$$

Figure 7:
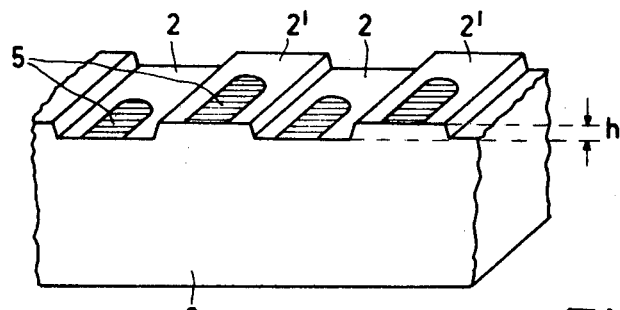
FIG. 7 is perspective view of a small part of a record carrier in accordance with the invention having an amplitude structure.

FIG. 7 shows a radial cross-section of a small part of a record carrier in accordance with the invention having an amplitude structure. The information areas 5 now for example comprise radiation-absorbing areas in reflecting substrate. As stated previously, a phase depth of $\psi = \pi$ rad. may be attributed to such a structure. This structure can only be read by means of the integral method. For a correctly separated read-out of the information tracks 2 and 2' the effective difference in level should be minimal $\lambda_e/8$. In the case of an amplitude structure the phase depth, to a greater extent than in the case of a phase structure, depends on the geometry of the information areas, mainly on the width of the areas relative to the effective wavelength of the read beam. Depending on this geometry a value somewhere between $\lambda_e/8$ and $\lambda_e/4$ should be selected for the effective difference in level.

It is to be noted that the values specified in the foregoing for the effective depths of the information areas and for the effective difference in level between the information tracks are not strict values. A satisfactory read-out can also be achieved if the effective depth and the effective difference in level slightly differ from the specified values.

It has already been proposed, for example, in the previous Netherlands patent application No. 78 02859, which corresponds to U.S. Pat. No. 4,363,116, to employ an optical record carrier as a storage medium for information other than video information and specifically as a storage medium which may be provided with information by the ultimate user. This may for example be information supplied by an (office) computer or radiograms made in a hospital. For this use the user is supplied with a record carrier which is provided with a so-called, for example spiral-shaped, servotrack, which extends over the entire record carrier.

During information recording by the user, the radial position of the write spot on the servotrack is detected and corrected with an opto-electronic servo-system, so that the information can be recorded with great accuracy in a constant-pitch signal track or in concentric tracks with a constant track spacing. The servo track is divided into a multitude of sectors, for example 128 per track revolution.

Figure 8:
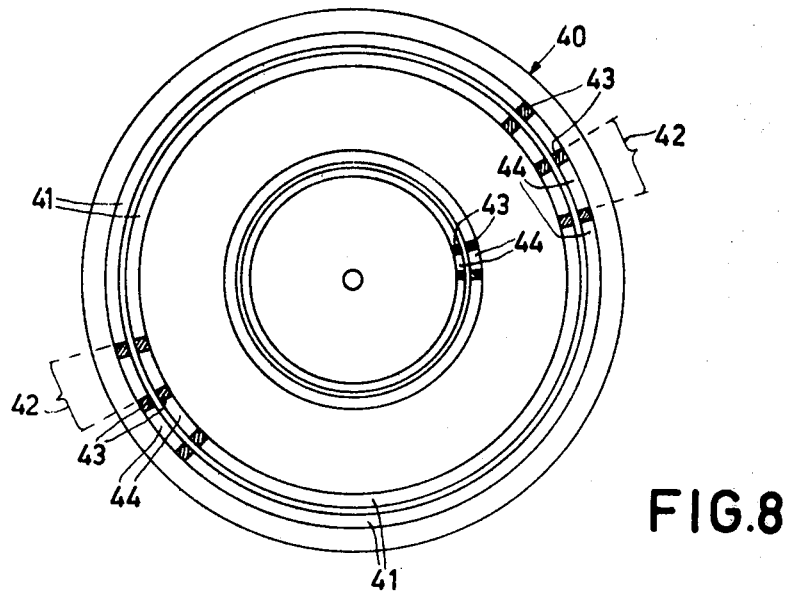
FIG. 8 is a plan view of a record carrier in which information can be recorded by a user.

FIG. 8 shows such a record carrier 40. The concentric servo tracks are designated 41 and the sectors are designated 42. Each sector comprises a track portion 44, in which information can be written and a sector address 43, in which in addition to further control information the address of the associated track portion 44 is encoded, for example in digital form, in address information areas. The address information areas are spaced from each other in the track direction by intermediate areas. The address information areas are suitably pits pressed into the record carrier surface or hills projecting from said surface.

In accordance with the invention the radially adjacent recording portions of the servo track may be situated at different levels. The user information is then for example recorded by melting pits into the blank servo track portions, which are for example coated with a tellurium layer. The information structure then obtained is an amplitude structure, so that the effective difference in level between the adjacent servo track portions should have a value between approximately $\lambda_e/8$ and approximately $\lambda_e/4$.

If for inscribing or reading said record carrier use is made of a so-called differential tracking system, that is a system in which the difference between the intensities in two radially different halves of the pupil of the read objective is determined, the blank servo track portions themselves should have a phase depth of approximately 110°. In that case the effective difference in level between adjacent track portions should have a value between approximately $\lambda_e/8$. and $\lambda_e/4$.

In the record carrier shown in FIG. 8 the radially adjacent sector addresses may also be situated at different levels. The information in said addresses takes the form of a phase structure and can be read by means of the integral method. The effective difference in level between the sector addresses should then be $\lambda_e/8$ for a reflecting structure.

A record carrier in accordance with the invention with a video and/or audio programme can be manufactured starting from a record carrier body in which an informationless track in the form of a groove with a comparatively great pitch is formed. The video and/or audio information may be written into a first track, coinciding with the groove, and in a second track situated between the turns of the groove in a manner as described in the article: "Laser beam recording of videomaster disks" in "Applied Optics" Vol. 17, No. 13, pages 2001–2006. The pre-grooved track may be formed in a record carrier body by means of the techniques described in said article, the intensity of the write beam being maintained constant.

If then a track with a small pitch is recorded and after each track revolution the intensity of the write beam is switched from a first level to a second level and vice versa, a record carrier body with two servo tracks at different levels is obtained, which record carrier body, after being provided with address sectors, is suitable for being inscribed by the final user.

A record carrier in accordance with the invention provided with a video and/or audio programme can also be obtained by the use of different illuminations for the consecutive track revolutions during the actual information recording process, in such a way that during a first track revolution only information areas and during a second track revolution both a track and information areas in said track, are recorded.

What is claimed is:

1. A record carrier comprising a planar substrate provided with an information structure having a plurality of elongated, generally parallel tracks, at least a portion of each track having a plurality of information areas which are spaced apart in the track direction by intermediate areas, said information areas in all of said portions being of the same type and differing in the same way from said intermediate areas such that when said portions are scanned by a read beam of radiation focussed to a spot thereon, said information and intermediate areas modulate the radiation in accordance with information stored therein, the portions of adjacent tracks which also are adjacent each other in a direction transverse to the track direction being disposed in different planes which are parallel to the plane of said substrate and are spaced from each other in a direction normal thereto by an effective distance which is a fraction of the effective wavelength of the radiation with which the information is to be read such as to reduce crosstalk between said adjacent portions during readout of the information.

2. The record carrier according to claim 1 wherein said information and intermediate areas in said portions define an amplitude structure and said effective distance is between approximately ⅛ and approximately ¼ of said effective wavelength.

3. The record carrier according to claim 1 wherein said information areas in said portions are pits extending below or projections extending above the plane of the associated portion by a substantially uniform, predetermined distance and wherein said effective distance is approximately half of said predetermined distance.

4. The record carrier according to claims 1, 2 or 3 wherein said substrate is a disk and said tracks are generally circular and extend about the center of said disk with alternate ones of said tracks defining turns of one of a pair of spirals, one spiral of said pair being disposed in one of said different planes and the second spiral being disposed in another of said different planes which is spaced from said one plane by said effective distance, said spirals being arranged so that the read direction of one spiral extends from the center of said disk towards its circumference and the read direction of the other spiral extends from the circumference of the disc to its center.

5. The record carrier according to claim 1, 2 or 3 wherein said substrate is a disc and said tracks are generally circular and extend about the center of said disc, said tracks having a plurality of said portions with alternate ones of said portions within a circular track being disposed in different ones of said different planes.

6. The record carrier according to claim 1 wherein said tracks have further portions which are provided with a radiation sensitive material for recording therein information with a write beam of radiation, said information and intermediate areas of said first-named portion of a given track defining an address of an associated further portion in that track and wherein said further portions which are adjacent each other in a direction transverse to the track are disposed in different planes which are parallel to the plane of said substrate and are spaced from each other in a direction normal thereto by an effective distance which is between approximately ¼ and approximately ⅛ of said effective wavelength, said further portions defining servo track portions for guiding the read and/or write beam of radiation.

7. The record carrier according to claim 1 wherein said tracks have further portions which are provided with a radiation sensitive material for recording therein information with a write beam of radiation, said information and intermediate areas of said first-named portion of a given track defining an address of an associated further portion in that track, and wherein said effective distance between said different planes on which adjacent ones of said first-named portions are disposed is approximately ⅛ of said effective wavelength.

8. A record carrier comprising a planar substrate provided with an information structure having a first plurality of elongated, generally parallel information tracks disposed in a first plane which is parallel to the plane of said substrate and a second plurality of elongated tracks which alternate with and are generally parallel to the tracks of said first plurality, said tracks of said second plurality being disposed in a second plane which is parallel to and is spaced from said first plane, said tracks of said first and second plurality containing pits which are all of substantially uniform depth or projections which are all of substantially uniform height and which are spaced apart in the track direction by intermediate areas, said pits or projections and said intermediate areas being adapted to modulate radiation of a beam with which they are scanned in accordance with information stored thereby, said first and second planes being spaced from each other in a direction normal thereto by an effective distance which is a fraction of the effective wavelength of the radiation with which the information is to be read such as to minimize crosstalk between adjacent tracks during readout of the information.

9. The record carrier according to claim 8 wherein said intermediate areas are lands coplanar with said first plane in the case of tracks of said first plurality and coplanar with said second plane in the case of tracks of said second plurality.

10. The record carrier according to claims 8 or 9 wherein said first and second planes are spaced by a distance which is approximately half the effective depth or effective height of said pits or projections, respectively.

11. The record carrier according to claim 10 wherein said information structure is reflective, said pits or projections have an effective depth or height, respectively, of approximately ¼ of said effective wavelength and said effective distance is approximately ⅛ of said effective wavelength.

12. The record carrier according to claim 10 wherein said information structure is reflective, said pits or projections have an effective depth or effective height, respectively, of approximately ⅛ of said effective wavelength and said effective distance is approximately 1/16 of said effective wavelength.

* * * * *